(12) United States Patent
Fujisawa

(10) Patent No.: US 11,106,414 B2
(45) Date of Patent: Aug. 31, 2021

(54) PRINTING SYSTEM, PRINTING METHOD, INFORMATION PROCESSING APPARATUS

(71) Applicant: SEIKO EPSON CORPORATION, Tokyo (JP)

(72) Inventor: Takatoshi Fujisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/789,773

(22) Filed: Feb. 13, 2020

(65) Prior Publication Data
US 2020/0264822 A1    Aug. 20, 2020

(30) Foreign Application Priority Data

Feb. 15, 2019 (JP) .............................. JP2019-025430

(51) Int. Cl.
| | | |
|---|---|---|
| *G06F 3/12* | (2006.01) | |
| *G06F 3/16* | (2006.01) | |
| *H04N 1/00* | (2006.01) | |
| *G06K 15/02* | (2006.01) | |

(52) U.S. Cl.
CPC .......... *G06F 3/1273* (2013.01); *G06F 3/1204* (2013.01); *G06F 3/1292* (2013.01); *H04N 1/00395* (2013.01); *H04N 1/00403* (2013.01)

(58) Field of Classification Search
None
See application file for complete search history.

(56) References Cited

U.S. PATENT DOCUMENTS

| | | | | |
|---|---|---|---|---|
| 5,869,824 A | * | 2/1999 | Okada | G06F 3/121 235/380 |
| 6,137,590 A | * | 10/2000 | Mori | G06K 15/02 358/1.17 |
| 2002/0030831 A1 | * | 3/2002 | Kinjo | H04N 1/407 358/1.9 |
| 2015/0317109 A1 | | 11/2015 | Kirihata | |
| 2019/0156825 A1 | * | 5/2019 | Shiga | G10L 15/22 |
| 2019/0362708 A1 | * | 11/2019 | Kitaguchi | G10L 15/26 |
| 2020/0028979 A1 | * | 1/2020 | Yamaguchi | G06F 3/1256 |
| 2020/0135189 A1 | * | 4/2020 | Jensen | G06F 3/167 |
| 2020/0151526 A1 | * | 5/2020 | Natori | G06F 3/1204 |

FOREIGN PATENT DOCUMENTS

JP    2015-213256    11/2015

* cited by examiner

*Primary Examiner* — Beniyam Menberu
(74) *Attorney, Agent, or Firm* — Workman Nydegger

(57) ABSTRACT

A printing system includes: a printing apparatus; and an information processing apparatus coupled to the printing apparatus over a network. The information processing apparatus includes a history storage unit that stores a print history that indicates a history of a printing operation performed by the printing apparatus. An acquisition unit acquires a keyword contained in a voice print command from a voice intermediate apparatus. A target record determiner determines, based on the keyword, a target record from individual records contained in the print history; the target record is an individual record to be reprinted. A print data transmitter generates print data, based on a related content and transmits the print data to the printing apparatus; the related content is one of printed contents which corresponds to the target record. The printing apparatus receives the print data and performs the printing operation in accordance with the print data.

8 Claims, 11 Drawing Sheets

| USER | CATEGORY | CONTENT ID | PRINT DATE AND TIME | |
|---|---|---|---|---|
| ... | ... | ... | ... | |
| USER 1 | COLORING DRAWING | 001 | 2018-11-10 08:10:10 | — R17 (R0) |
| USER 1 | COLORING DRAWING | 002 | 2018-11-22 08:10:20 | — R16 (R0) |
| USER 1 | COLORING DRAWING | 003 | 2018-11-23 08:20:10 | — R15 (R0) |
| USER 1 | CALENDAR | 201811 | 2018-11-23 10:10:10 | — R14 (R0) |
| USER 2 | CALENDAR | 201811 | 2018-11-23 15:10:10 | — R22 (R0) |
| USER 1 | COLORING DRAWING | 004 | 2018-11-24 09:10:10 | — R13 (R0) |
| USER 3 | NOTE | 101 | 2018-11-24 12:10:10 | — R32 (R0) |
| USER 2 | COLORING DRAWING | 011 | 2018-11-24 13:10:30 | — R21 (R0) |
| USER 3 | CALENDAR | 201811 | 2018-11-24 14:30:10 | — R31 (R0) |
| USER 1 | COLORING DRAWING | 005 | 2018-11-24 15:10:40 | — R12 (R0) |
| USER 1 | NOTE | 101 | 2018-11-24 16:40:10 | — R11 (R0) |

| REQUEST KEYWORD "REPRINT" | |
|---|---|
| KEYWORD (WHICH INDIVIDUAL RECORD) | PROCESS |
| PREVIOUSLY | REPRINT CONTENT OF LATEST INDIVIDUAL RECORD |
| RECENTLY | REPRINT CONTENT OF LATEST INDIVIDUAL RECORD |
| TWO TIMES AGO | REPRINT CONTENT OF INDIVIDUAL RECORD PRINTED TWO TIMES AGO |
| THREE TIMES AGO | REPRINT CONTENT OF INDIVIDUAL RECORD PRINTED THREE TIMES AGO |
| ... | ... |
| THE FIRST | REPRINT CONTENT OF INDIVIDUAL RECORD READ FIRST |
| THE SECOND | REPRINT CONTENT OF INDIVIDUAL RECORD READ SECOND |
| ... | ... |
| KEYWORD (WHICH CATEGORY) | PROCESS |
| COLORING DRAWING | NARROW DOWN SEARCH FOR INDIVIDUAL RECORDS TO THOSE OF COLORING DRAWINGS |
| CALENDAR | NARROW DOWN SEARCH FOR INDIVIDUAL RECORDS TO THOSE OF CALENDARS |
| NOTE | NARROW DOWN SEARCH FOR INDIVIDUAL RECORDS TO THOSE OF NOTES |
| ... | ... |

| REQUEST KEYWORD "WHAT CONTENTS WERE PRINTED" ||
|---|---|
| KEYWORD (WHICH INDIVIDUAL RECORD) | PROCESS |
| TO DATE | READ M NUMBER OF RECENT INDIVIDUAL RECORDS |
| TODAY | READ INDIVIDUAL RECORDS PRINTED TODAY |
| YESTERDAY | READ INDIVIDUAL RECORDS PRINTED YESTERDAY |
| ... | ... |
| KEYWORD (WHICH CATEGORY) | PROCESS |
| COLORING DRAWING | NARROW DOWN INDIVIDUAL RECORDS TO BE READ TO THOSE OF COLORING DRAWINGS |
| CALENDAR | NARROW DOWN INDIVIDUAL RECORDS TO BE READ TO THOSE OF CALENDARS |
| NOTE | NARROW DOWN INDIVIDUAL RECORDS TO BE READ TO NOTES |
| ... | ... |

KE4, KE4, KE4 (TO DATE, TODAY, YESTERDAY)
KE6, KE6, KE6 (COLORING DRAWING, CALENDAR, NOTE)
KE0

| USER | CATEGORY | CONTENT ID | PRINT DATE AND TIME | |
|---|---|---|---|---|
| ... | ... | ... | ... | |
| USER 1 | COLORING DRAWING | 001 | 2018-11-10 08:10:10 | R17 (R0) |
| USER 1 | COLORING DRAWING | 002 | 2018-11-22 08:10:20 | R16 (R0) |
| USER 1 | COLORING DRAWING | 003 | 2018-11-23 08:20:10 | R15 (R0) |
| USER 1 | CALENDAR | 201811 | 2018-11-23 10:10:10 | R14 (R0) |
| USER 2 | CALENDAR | 201811 | 2018-11-23 15:10:10 | R22 (R0) |
| USER 1 | COLORING DRAWING | 004 | 2018-11-24 09:10:10 | R13 (R0) |
| USER 3 | NOTE | 101 | 2018-11-24 12:10:10 | R32 (R0) |
| USER 2 | COLORING DRAWING | 011 | 2018-11-24 13:10:30 | R21 (R0) |
| USER 3 | CALENDAR | 201811 | 2018-11-24 14:30:10 | R31 (R0) |
| USER 1 | COLORING DRAWING | 005 | 2018-11-24 15:10:40 | R12 (R0) |
| USER 1 | NOTE | 101 | 2018-11-24 16:40:10 | R11 (R0) |

600

PRINTING SYSTEM, PRINTING METHOD, INFORMATION PROCESSING APPARATUS

The present application is based on, and claims priority from JP Application Serial Number 2019-025430, filed Feb. 15, 2019, the disclosure of which is hereby incorporated by reference herein in its entirety.

BACKGROUND

1. Technical Field

The present disclosure relates to a printing system that includes a printing apparatus and an information processing apparatus and further relates to a printing method and the information processing apparatus.

2. Related Art

Cloud print services that cause printers to print contents via server computers are now available. Also, smart speakers that operate in concert with voice recognition services in the cloud are commercially available.

As a reference, JP-A-2015-213256 discloses a printing system in which a client personal computer (PC) is coupled to an image forming apparatus over a local area network (LAN). To cause the image forming apparatus to print a desired content, a user needs to transmit the print data from the client PC to the image forming apparatus and go to where the image forming apparatus is disposed. Then, the user listens to a voice message "print starts" or "the function is selected" from the image forming apparatus, for example, and gives a voice command to the image forming apparatus so as to perform a specific function, such as copying or boxing.

In the above printing system, the client PC is not configured to accept a voice command, and the image forming apparatus is not configured to reprint a printed content in accordance with a voice command. In terms of usability, the printing system preferably allows a user to select a content to be reprinted from among a plurality of printed contents by using a voice command. This configuration is desirable, especially when a commercially available smart speaker is used.

SUMMARY

The present disclosure is a printing system that includes: a printing apparatus; and an information processing apparatus coupled to the printing apparatus over a network. The information processing apparatus includes a history storage unit that stores a print history that indicates a history of a printing operation performed by the printing apparatus. An acquisition unit acquires a keyword contained in a voice print command from a voice intermediate apparatus. A target record determiner determines, based on the acquired keyword, a target record from a plurality of individual records contained in the print history; the target record is an individual record to be reprinted. A print data transmitter generates print data, based on a related content and transmits the generated print data to the printing apparatus; the related content is one of a plurality of printed contents which corresponds to the determined target record. The printing apparatus is configured to receive the print data and to perform the printing operation in accordance with the print data.

The present disclosure is a printing method using a printing apparatus and an information processing apparatus. The printing apparatus is coupled to the information processing apparatus over a network. The printing method includes an acquiring step, a target record determining step, a print data generating step, a print data transmitting step, and a printing step. In the acquiring step, the information processing apparatus acquires a keyword contained in a voice print command from a voice intermediate apparatus. In the target record determining step, a target record is determined, based on the acquired keyword, from a plurality of individual records contained in a print history; the target record is an individual record to be reprinted, and the print history indicates a history of a printing operation performed by the printing apparatus. In the print data generating step, print data is generated based on a related content, which is one of a plurality of printed contents which corresponds to the determined target record. In the print data transmitting step, the information processing apparatus transmits the generated print data to the printing apparatus. In the printing step, the printing apparatus performs the printing operation in accordance with the received print data.

The present disclosure is an information processing apparatus that is coupled to a printing apparatus over a network. The printing apparatus is configured to perform a printing operation in accordance with print data. The information processing apparatus includes a history storage unit that stores a print history that indicates a history of a printing operation performed by the printing apparatus. An acquisition unit acquires a keyword contained in a voice print command from a voice intermediate apparatus. A target record determiner determines, based on the acquired keyword, a target record from a plurality of individual records contained in the print history; the target record is an individual record to be reprinted. A print data transmitter generates print data, based on a related content and transmits the generated print data to the printing apparatus; the related content is one of a plurality of printed contents which corresponds to the determined target record.

The present disclosure is a non-transitory computer-readable storage medium that includes an information processing program provided for an information processing apparatus that is coupled to a printing apparatus over a network. The printing apparatus is configured to perform a printing operation in accordance with print data. The information processing program causes a computer to perform: an acquiring function of acquiring a keyword contained in a voice print command from a voice intermediate apparatus; a target record determining function of determining, based on the acquired keyword, a target record from a plurality of individual records contained in a print history, the target record being an individual record to be reprinted, the print history indicating a history of a printing operation performed by the printing apparatus; a print data transmitting function of generating print data, based on a related content, the related content being one of a plurality of printed contents which corresponds to the determined target record and of transmitting the generated print data from the information processing apparatus to the printing apparatus.

BRIEF DESCRIPTION OF THE DRAWINGS

FIG. 3 is a schematic block diagram of a configuration example of the printing history table.

FIG. 4 is a schematic block diagram of a configuration example of the printing process table.

FIG. 5 is a schematic block diagram of a configuration example of the reading process table.

FIG. 9 is a schematic diagram of an example of a process of narrowing down a search for individual records contained in the print history to those that have been reprinted within a past predetermined period.

DESCRIPTION OF EXEMPLARY EMBODIMENTS

Figure 1:
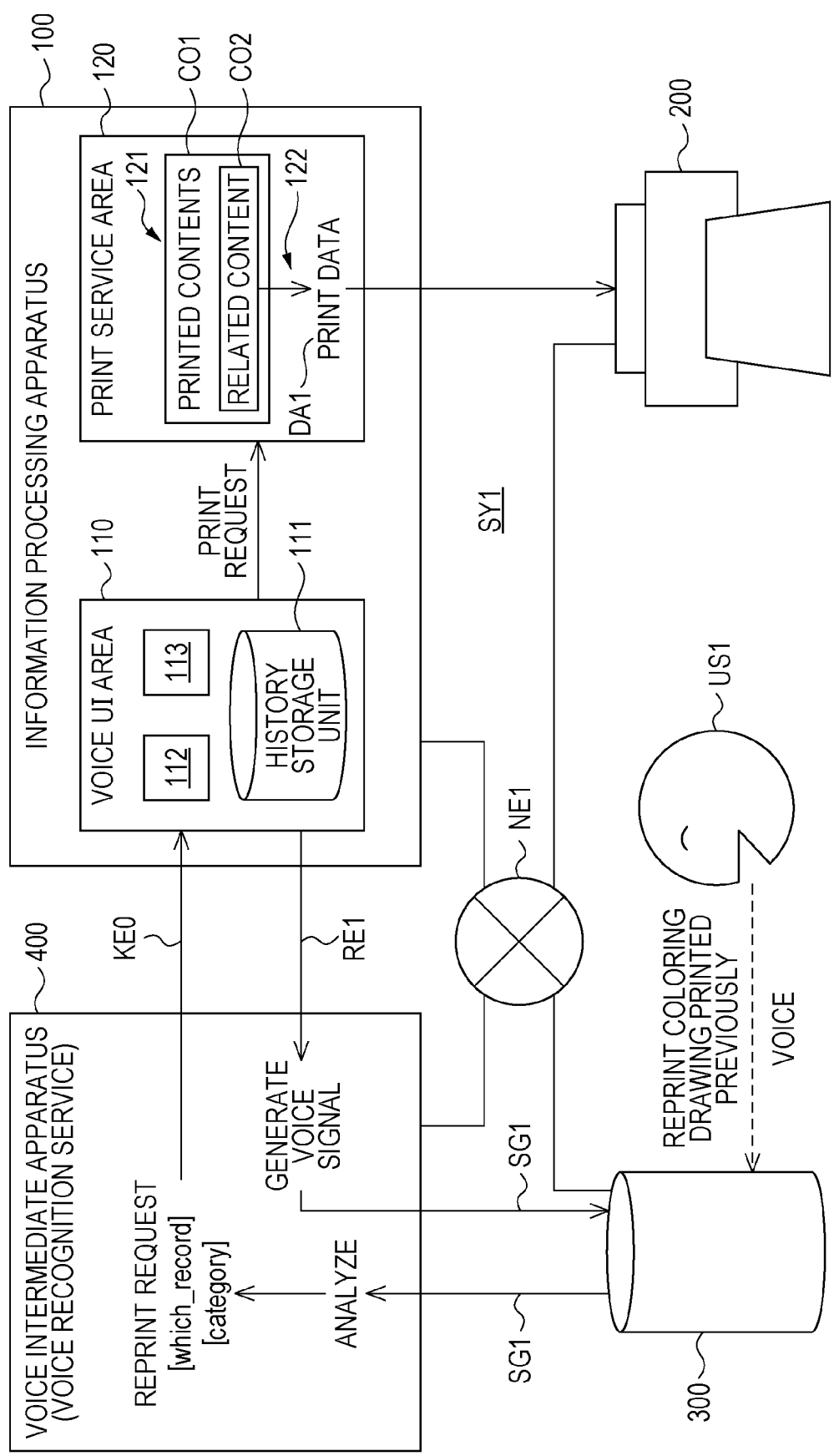
FIG. 1 is a schematic block diagram of a configuration example of an overall system that includes a printing system according to an embodiment of the present disclosure.

Some embodiments of the present disclosure will be described below. It should be noted that such embodiments are examples of the present disclosure and their features are not necessarily essential for the present disclosure.

1. TECHNICAL SUMMARY OF THE PRESENT DISCLOSURE

With reference to the examples of FIGS. 1 to 11, the technical summary of the present disclosure will be described below. FIGS. 1 to 11 schematically illustrate some examples of the present disclosure. It should be noted that the scales in individual distances in these drawings may differ from one another and thus may lack the consistency. Obviously, individual components of the present disclosure are not limited to those denoted by characters. In "1. Technical summary of the present disclosure", the words inside the parentheses are used to supplement their previous terms.

First Aspect

According to a first aspect of the present disclosure, a printing system SY1 includes: a printing apparatus (e.g., printer 200); and an information processing apparatus 100 coupled to the printing apparatus (200) over a network NE1. The information processing apparatus 100 includes a history storage unit 111, an acquisition unit 112, a target record determiner 113, and a print data transmitter 122. The history storage unit 111 stores a print history 600 that indicates a history of a printing operation performed by the printing apparatus (200). The acquisition unit 112 acquires a keyword KE0 contained in a voice print command from a voice intermediate apparatus 400. The target record determiner 113 determines, based on the acquired keyword KE0, a target record from a plurality of individual records R0 contained in the print history 600; the target record is an individual record to be reprinted. The print data transmitter 122 generates print data DA1, based on a related content CO2 and transmits the generated print data DA1 to the printing apparatus (200); the related content CO2 is one of a plurality of printed contents CO1 which corresponds to the determined target record. The printing apparatus (200) is configured to receive the print data DA1 and to perform the printing operation in accordance with the print data DA1.

In the foregoing first aspect, the information processing apparatus 100 generates print data DA1, based on the keyword KE0 contained in the voice print command and one of the printed contents CO1 contained in the print history 600 which corresponds to the determined target record. Then, the information processing apparatus 100 transmits the generated print data DA1 to the printing apparatus (200). When receiving the print data DA1, the printing apparatus (200) performs the printing operation in accordance with the received print data DA1, thereby reprinting the printed content CO1 in accordance with the voice print command of a user US1. In this way, the printing system SY1 successfully reprints a desired printed content in accordance with a voice print command.

The information processing apparatus 100 may be either a single computer or a plurality of computers coupled together. For example, the keyword KE0 may be words, a phrase, or a clause that can be handled together to determine a target record. If the print history 600 contains a plurality of individual records, the target record determiner may determine that one or more of the individual records are target records. It should be noted that the above descriptions are also applicable to the aspects that will be described below.

Second Aspect

As illustrated in FIG. 4, the keyword KE0 may include a selection keyword KE1 for use in determining the target record from the individual records contained in the print history 600. When the acquisition unit 112 acquires the selection keyword KE1, the target record determiner 113 may determine that one of the individual records contained in the print history 600 which is related to the selection keyword KE1 is the target record. In this way, the printing system SY1 selects a printed content to be reprinted from among printed contents CO1 contained in the print history 600 in accordance with the voice print command, thereby successfully providing a preferred example of reprinting a desired printed content.

Although not included in the foregoing second aspect, the keyword KE0 may include a specific keyword for use in determining two or more target records from the individual records R0 contained in the print history 600. When the acquisition unit acquires the specific keyword, the target record determiner may determine one or more target records in the print history 600 which are related to the specific keyword are the target records.

Third Aspect

As illustrated in FIG. 4, the selection keyword KE1 may include a last print determination keyword KE2 for use in determining that a record that has been printed last is the target record. When the acquisition unit 112 acquires the last print determination keyword KE2, the target record determiner 113 may determine that one of the individual records R0 contained in the print history 600 which has been printed last is the target record. In this way, the printing system SY1 selects the print content that has been printed last from among the printed contents CO1 in accordance with a voice print command, thereby successfully providing a preferred example of reprinting the print content that has been printed last.

Fourth Aspect

As illustrated in FIG. 4, the selection keyword KE1 may include an N-times-ago determination keyword KE3 for use in determining that a record that has been printed N times ago is the target record; N is an integer equal to or more than two. When the acquisition unit 112 acquires the N-times-ago determination keyword KE3, the target record determiner 113 may determine that one of the individual records R0 contained in the print history 600 which has been printed N times ago is the target record. In this way, the printing system SY1 selects the print content that has been printed N times ago from among the printed contents CO1 in accordance with a voice print command, thereby successfully providing a preferred example of reprinting the print content that has been printed N times ago.

Fifth Aspect

As illustrated in FIG. 5, the keyword KE0 may include a read instruction keyword KE4 for use in reading individual record information IM3 that indicates the individual records R0 together with record identification information IM2 added to the individual records R0 contained in the print history 600. The keyword KE0 may also include a record-identification-information determination keyword KE5 for use in determining the record identification information IM2. When the acquisition unit 112 acquires the read instruction keyword KE4, the target record determiner 113 may output a read request RE1 to the voice intermediate apparatus 400 in such a way that the voice intermediate apparatus 400 outputs a voice signal containing the record identification information IM2 and the individual record information IM3 to a voice input/output apparatus (e.g., smart speaker 300). When the acquisition unit 112 acquires the record-identification-information determination keyword KE5, the target record determiner 113 may determine that one of read targets of the individual records R0 contained in the print history 600 which is related to the record-identification-information determination keyword KE5 is a target record. In this way, the printing system SY1 enables the user US1 to listen to individual records R0 contained in the print history 600 and to select a print content to be reprinted from among the print history 600 by using a voice command, thereby successfully providing a preferred example of reprinting a desired printed content.

Sixth Aspect

As illustrated in FIG. 9, the target record determiner 113 may determine one of the individual records R0 contained in the print history 600 which has been printed within a past predetermined period is the target record. There are cases where the user US1 forgets some contents that have been printed before. The printing system SY1 deletes, from target records, individual records R0 that have been stored in the print history 600 for more than a predetermined period, thereby improving privacy protection. Consequently, the printing system SY1 successfully provides a preferred example of providing highly secure privacy protection.

Seventh Aspect

As illustrated in FIG. 3, for example, the history storage unit 111 may store the print history 600 in which the individual records R0 are related to a plurality of categories. As illustrated in FIG. 4, for example, the keyword KE0 may include a category keyword KE6 for use in determining a category. When the acquisition unit 112 acquires the category keyword KE6, the target record determiner 113 may determine that one of the individual records R0 contained in the print history 600 which has been related to the category is the target record. In this way, the printing system SY1 enables the user US1 to designate the category of a print content to be reprinted which is selected from among the printed contents CO1 with a voice print command, thereby successfully providing a preferred example of reprinting a desired printed content.

Eighth Aspect

As illustrated in FIG. 3, for example, the history storage unit 111 may store the print history 600 in which the individual records R0 are linked to a plurality of users US1. The acquisition unit 112 may acquire user identification information (e.g., user IDs in FIG. 8) from the voice intermediate apparatus 400; the user identification information is used to identify the users US1. The target record determiner 113 may determine that one of the individual records R0 contained in the print history 600 which is linked to a user US1 related to the user identification information (user ID) is the target record. In this way, the printing system SY1 sorts print contents to reprinted, which are selected from the printed contents CO1, in accordance with the users US1, thereby successfully providing a preferred example of reprinting a desired printed content.

Ninth Aspect

According to a second aspect of the present disclosure, a printing method uses a printing apparatus (200) and an information processing apparatus 100 that are coupled together over a network NE1. The printing method includes an acquiring step ST1, a target record determining step ST2, a print data generating step ST3, a print data transmitting step ST4, and a printing step ST5. In the acquiring step ST1, the information processing apparatus 100 acquires a keyword KE0 contained in a voice print command from a voice intermediate apparatus 400. In the target record determining step ST2, the information processing apparatus 100 determines a target record, based on the acquired keyword KE0, from a plurality of individual records R0 contained in a print history 600; the target record is an individual record R0 to be reprinted, and the print history 600 indicates a history of a printing operation performed by the printing apparatus (200). In the print data generating step ST3, the information processing apparatus 100 generates print data DA1, based on a related content CO2, which is one of a plurality of printed contents CO1 which corresponds to the determined target record. In the print data transmitting step ST4, the information processing apparatus 100 transmits the generated print data DA1 to the printing apparatus (200). In the printing step ST5, the printing apparatus (200) performs the printing operation in accordance with the received print data DA1. In this way, the printing method makes it possible to reprint a desired printed content in accordance with a voice print command.

Tenth Aspect

According to a third aspect of the present disclosure, an information processing apparatus 100 is coupled to a printing apparatus (200) over a network NE1. The printing apparatus (200) is configured to perform a printing operation in accordance with print data DA1. The processing apparatus 100 includes a history storage unit 111, an acquisition unit 112, a target record determiner 113, and a print data transmitter 122. The history storage unit 111 stores a print history 600 that indicates a history of a printing operation performed by the printing apparatus (200). An acquisition unit 112 acquires a keyword KE0 contained in a voice print command from a voice intermediate apparatus 400. A target record determiner 113 determines, based on the acquired keyword KE0, a target record from a plurality of individual records R0 contained in the print history 600; the target record is an individual record R0 to be reprinted. A print data transmitter 122 generates print data DA1, based on a related content CO2 and transmits the generated print data DA1 to the printing apparatus (200); the related content CO2 is one of a plurality of printed contents CO1 which corresponds to the determined target record. When receiving the print data DA1, the printing apparatus (200) performs the printing operation in accordance with the received print data DA1, thereby reprinting the printed content CO1 in accordance with the voice print command of a user US1. In this way, the information processing apparatus 100 successfully causes the printing apparatus (200) to reprint a desired printed content in accordance with a voice print command.

Eleventh Aspect

According to a fourth aspect of the present disclosure, a non-transitory computer-readable storage medium includes an information processing program PR1 provided for an information processing apparatus 100 that is coupled to a printing apparatus (200) over a network NE1. The printing apparatus (200) is configured to perform a printing operation in accordance with print data DA1. The information processing program PR1 causes a computer (e.g., information processing apparatus 100) to perform an acquiring function FU1, a target record determining function FU2, and a print data transmitting function FU3. In the acquiring function FU1, a keyword KE0 contained in a voice print command is acquired from a voice intermediate apparatus 400. In the target record determining function FU2, a target record is determined, based on the acquired keyword KE0, from a plurality of individual records R0 contained in a print history 600; the target record is an individual record R0 to be reprinted, and the print history 600 indicates a history of a printing operation performed by the printing apparatus (200). In the print data transmitting function FU3, print data DA1 is generated based on a related content CO2, which is one of a plurality of printed contents CO1 which corresponds to the determined target record, and the generated print data DA1 is transmitted to the printing apparatus (200). When receiving the print data DA1, the printing apparatus (200) performs the printing operation in accordance with the received print data DA1, thereby reprinting the printed content CO1 in accordance with the voice print command of a user US1. In this way, using the non-transitory computer-readable storage medium successfully reprints a desired printed content in accordance with a voice print command.

Some aspects of the present disclosure are applicable to, for example, a complex system that includes a printing system as described above, a complex system that includes an information processing apparatus as described above, an information processing method to be performed by an information processing apparatus as described above, and a non-transitory computer-readable storage medium that stores an information processing program as described above. Each of the above apparatuses may be a plurality of components disposed separately from one another.

2. MOTIVATION TO TECHNOLOGY OF THE PRESENT DISCLOSURE

Smart speakers that operate in concert with cloud voice recognition services are now commercially available. When a user causes a printer to print a desired content by giving a voice command to a smart speaker, he/she needs to instruct the printer to sequentially prints fixed contents stored in a cloud print service, because it is difficult to designate a specific content with a voice command. Therefore, when the user wishes to reprint a specific content, he/she needs to cause the printer to print all the contents in the cloud print service, which may be inconvenient.

The user cannot know what contents will be printed at the time of giving a print command, because contents stored in the cloud print service may change whenever the printer performs a printing operation. If the cloud print service provides ten types of coloring drawings as print contents, for example, when the user gives a voice request "print the coloring drawing" to the smart speaker, the printer prints only one type of coloring drawings. Then, when the user gives a voice request "print the coloring drawing" to the smart speaker again, the printer may print another type of coloring drawings. Since it is difficult to designate a specific type of coloring drawings with a voice command, the user needs to cause the printer to print all the types of coloring drawings in the cloud print service when wishing to reprint a certain type of coloring drawing.

The technology of the present disclosure enables a user to cause a printer to reprint a desired printed content with a voice command even if the voice command fails to directly designate this content. A concrete example of the present disclosure will be described below.

3. CONCRETE EXAMPLE OF CONFIGURATION OF PRINTING SYSTEM

FIG. 1 is a schematic block diagram of a configuration example of an overall system including a printing system SY1. The overall system includes an information processing apparatus 100, a printer 200, a smart speaker 300, and a voice intermediate apparatus 400. Both of the information processing apparatus 100 and the printer 200 are included in the printing system SY1. All of the information processing apparatus 100, the printer 200, the smart speaker 300, and the voice intermediate apparatus 400 are interconnected via a network NE1, which includes the Internet. Optionally, the network NE1 may further include a local area network (LAN). The information processing apparatus 100, the printer 200, the smart speaker 300, and the voice intermediate apparatus 400 may be coupled to the network NE1 in a wired or wireless manner or in both a wired and wireless manner. The information processing apparatus 100, which may be a server computer that provides a function called a cloud print service, makes a voice user interface (UI) available for the voice intermediate apparatus 400. When receiving some keywords KE0 from the voice intermediate apparatus 400, the information processing apparatus 100 generates print data DA1 based on the received keywords KE0 and then transmits the generated print data DA1 to the printer 200. The printer 200 may be a printing apparatus that creates a print image in accordance with the print data DA1 from the information processing apparatus 100. The smart speaker 300 may be a voice input/output apparatus that utilizes a function called a voice recognition service provided by the voice intermediate apparatus 400. The voice intermediate apparatus 400 may be a server computer that provides the voice recognition service incorporating artificial intelligence (AI).

Herein, the "voice UI" corresponds to the section of the information processing apparatus 100 which realizes a function called the voice UI, and the "cloud print service" corresponds to the section of the information processing apparatus 100 which realizes a function called the cloud print service.

The information processing apparatus 100 includes: a voice UI area 110 in which information for use in realizing the voice UI is stored; and a print service area 120 in which information for use in realizing the cloud print service is stored. The voice UI may be a service that the provider for the cloud print service establishes on the platform of the voice recognition service. The voice UI area 110 contains a history storage unit 111, an information area in which an acquisition unit 112 that acquires keywords KE0 is implemented, and an information area in which a target record determiner 113 is implemented. The print service area 120 contains a content storage unit 121 and an information area in which a print data transmitter 122 is implemented. Obviously, the voice UI and the cloud print service may be implemented by different computers. Alternatively, the voice UI may be implemented by the server computer that provides the voice recognition service.

For example, if a user US1 speaks "reprint the previously printed coloring drawing", the smart speaker 300 converts the user's voice into a digital voice signal SG1 and then transmits the converted digital voice signal SG1 to the voice intermediate apparatus 400 over the network NE1. When receiving the digital voice signal SG1, the voice intermediate apparatus 400 analyzes the voice contained in the digital voice signal SG1. If the voice contains a request keyword "reprint", the voice intermediate apparatus 400 requests the voice UI to perform a print operation and passes the keywords KE0 "previously" and "coloring drawing". The "print request [which_record] [category]" in FIG. 1 is an example of a request containing the keywords KE0. The "[which_record]" corresponds to a keyword, such as "previously", for use in determining, based on a print history, which of individual records is to be reprinted. Herein, the individual records correspond to the records of contents that have been printed. The "[category]" corresponds to a keyword for use in specifying the category, such as "coloring drawing", which the individual record to be reprinted belongs to. When receiving the keywords KE0, the voice UI searches, based on the received keywords KE0, the history storage unit 111 for a target record. Herein, the target record corresponds to an individual record to be reprinted. Then, the voice UI transmits a request to the cloud print service to reprint the found target record. When receiving the print request, the cloud print service generates print data DA1 on a related content CO2, which is one of printed contents CO1. Herein, the related content CO2 corresponds to the found target record, and the printed contents CO1 correspond to contents of all the printed individual records. Then, the cloud print service transmits the generated print data DA1 to the printer 200 over the network NE1. When receiving the print data DA1, the printer 200 prints the related content CO2 based on the received print data DA1. In this way, the printer 200 reprints the "previously printed coloring drawing" spoken by the user US1. In this case, in addition to designating a content to be reprinted by using the keywords KE0, the user US1 may also designate a printer that prints the content, for example, by speaking "reprint the previously printed coloring drawing with the A printer".

In the above way, the user can cause the printer 200 to print a desired printed content with a voice command even if the voice command fails to directly designate this content. Since the user knows which content is to be reprinted, he/she can instruct the smart speaker 300 to print a desired content with a voice command. The request keyword for use in printing a content is not limited to the "print . . . ". Alternatively, the request keyword may be "do printing of . . . " or any other similar words. Even in this case, the printing system SY1 can also perform a similar printing process.

The voice UI may transmit a request, such as a read request RE1, which is a request to read the print history, to the voice intermediate apparatus 400. When receiving the read request RE1, the voice intermediate apparatus 400 converts the print history into a digital voice signal SG1 and then transmits the converted voice signal SG1 to the smart speaker 300 over the network NE1. When receiving the digital voice signal SG1, the smart speaker 300 converts the received digital voice signal SG1 to a voice signal and outputs this voice signal. In this way, the smart speaker 300 reads the print history.

Figure 2:
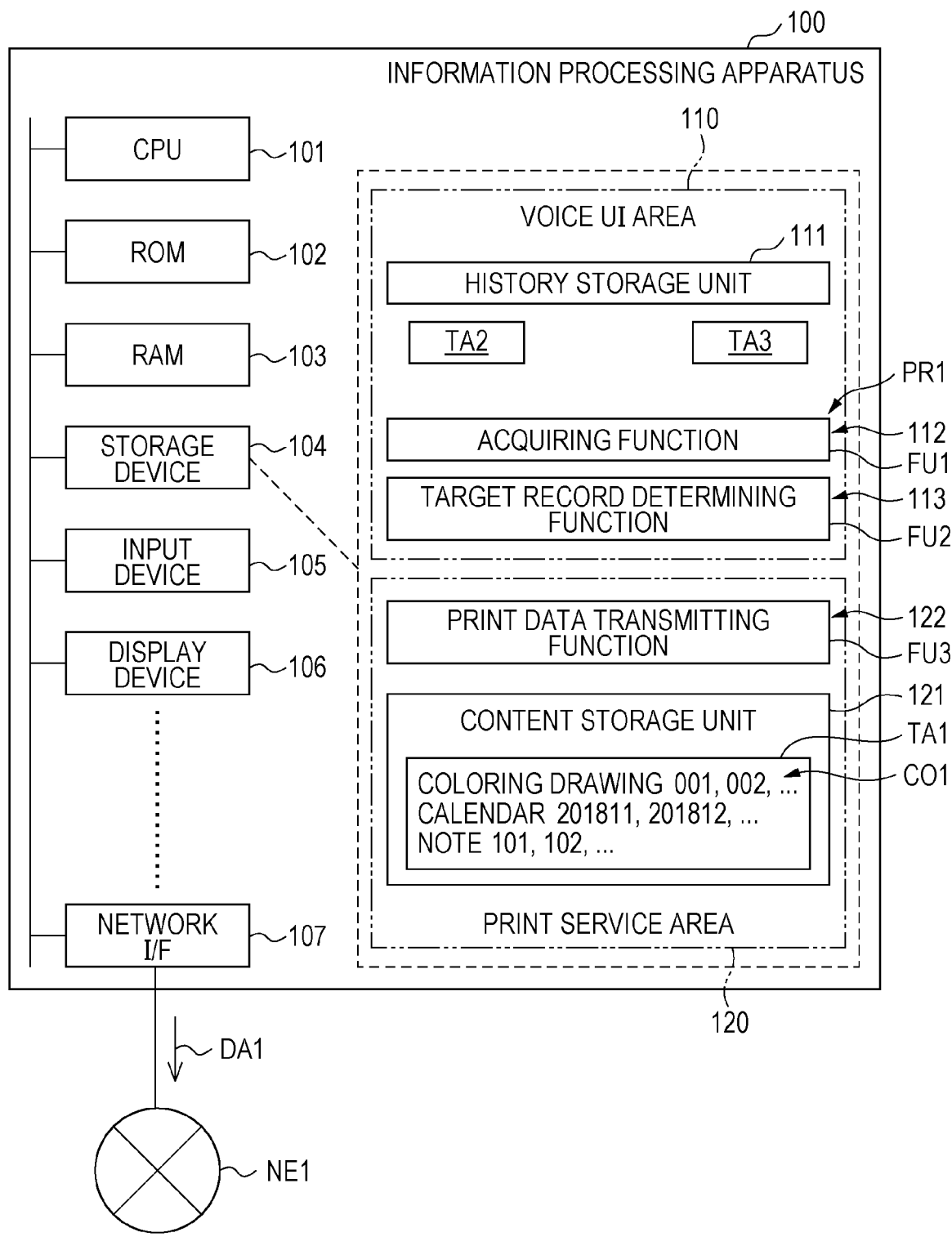
FIG. 2 is a schematic block diagram of a configuration example of the information processing apparatus.

FIG. 2 is a schematic block diagram of a configuration example of the information processing apparatus 100. The information processing apparatus 100 includes a single computer with the voice UI area 110 and the print service area 120. However, the information processing apparatus 100 may include a plurality of server computers interconnected together. For example, the information processing apparatus 100 may include a first server computer with the voice UI area 110 and a second server computer with the print service area 120. The voice UI area 110 may be provided in a server computer that provides a voice recognition service. Even in this case, the information processing apparatus 100 with the voice UI area 110 and the print service area 120 can also be constituted.

As illustrated in FIG. 2, the information processing apparatus 100 includes a central processing unit (CPU) 101, read only memory (ROM) 102, random access memory (RAM) 103, a storage device 104, an input device 105, a display device 106, and a network interface (I/F) 107; the CPU 101 may be a processor, and each of the ROM 102 and the RAM 103 may be a semiconductor memory. All of these components are electrically interconnected so that one of the components can transmit/receive information to or from another.

The voice UI area 110 and the print service area 120 are provided in the storage device 104, in which an unillustrated operating system (OS) and other programs are stored. Stored in the voice UI area 110 are a history storage unit 111, a program that causes the information processing apparatus 100 to realize an acquiring function FU1 and a target record determining function FU2, a printing process table TA2, a reading process table TA3, for example. Stored in the print service area 120 are a content storage unit 121 and a program that causes the information processing apparatus 100 to realize a print data transmitting function FU3, for example. The acquiring function FU1, the target record determining function FU2, and the print data transmitting function FU3 are realized by the information processing apparatus 100 in accordance with an information processing program PR1. As illustrated in FIG. 2, stored in the content storage unit 121 is data on a plurality of coloring drawings, calendars, and notes, for example. After a print content stored in the content storage unit 121 is printed, this print content becomes one of the printed contents CO1. Information stored in the storage device 104 is read onto the RAM 103 as appropriate and used for a process of causing the printer 200 to print a content. For example, the storage device 104 may be a magnetic storage device, such as a hard disk, or a nonvolatile semiconductor memory, such as a flash memory.

For example, the input device 105 may be a pointing device, a hard key such as a keyboard, or a touch panel disposed on the front surface of the display panel. For example, the display device 106 may be a liquid crystal display panel. The network I/F 107 is coupled to the network NE1 so that the information processing apparatus 100 can communicate with any apparatus coupled to the network NE1 in conformity with a predetermined communication protocol.

The CPU 101 reads the information processing program PR1 from the storage device 104 onto the RAM 103 and executes the information processing program PR1, thereby performing an acquiring process related to the acquiring function FU1, a target record determining process related to the target record determining function FU2, and a print data transmitting process related to the print data transmitting function FU3. The information processing program PR1 causes the information processing apparatus 100 implemented by a computer to function as the acquisition unit 112 related to the acquiring function FU1, the target record determiner 113 related to the target record determining function FU2, and the print data transmitter 122 related to the print data transmitting function FU3. The information processing apparatus 100 that executes the information processing program PR1 performs an acquiring step ST1, a target record determining step ST2, a print data generating step ST3, and a print data transmitting step ST4, as will be described with reference to FIG. 8. A non-transitory computer-readable storage medium that stores the information processing program PR1 may be disposed either in the storage device 104 inside the information processing apparatus 100 or in a storage device outside the information processing apparatus 100.

FIG. 3 is a schematic block diagram of a configuration example of a printing history table TA1 stored in the history storage unit 111. The printing history table TA1 has a print history 600, which indicates the history of printing operations performed by the printer 200. The print history 600 has individual records R0 generated whenever the printing operations are performed. Each of the individual records R0 contains information on a user, a category, a content identification (ID), and a print date and time. Further, the information on the user, the category, and the print content ID is linked to the information on the print date and time, which is used to determine the individual record R0. Since each individual record R0 contains the information on the user, the print history 600 in the printing history table TA1 contains the individual records R0 linked to users US1. Since each individual record R0 contains the information on the category, the print history 600 in the printing history table TA1 contains the individual records R0 linked to categories.

As illustrated in FIG. 3, the print history 600 contains the information on categories; however, the print history 600 does not have to contain this information if no categories are defined. Likewise, the print history 600 contains the information on users; however, the print history 600 does not necessarily have to contain this information. In the example of FIG. 3, the individual records R0 related to a user 1 are defined as individual records R11 to R17, the individual records R0 related to a user 2 are defined as individual records R21 and R22, and the individual records R0 related to a user 3 are defined as individual records R31 and R32.

Figure 11:
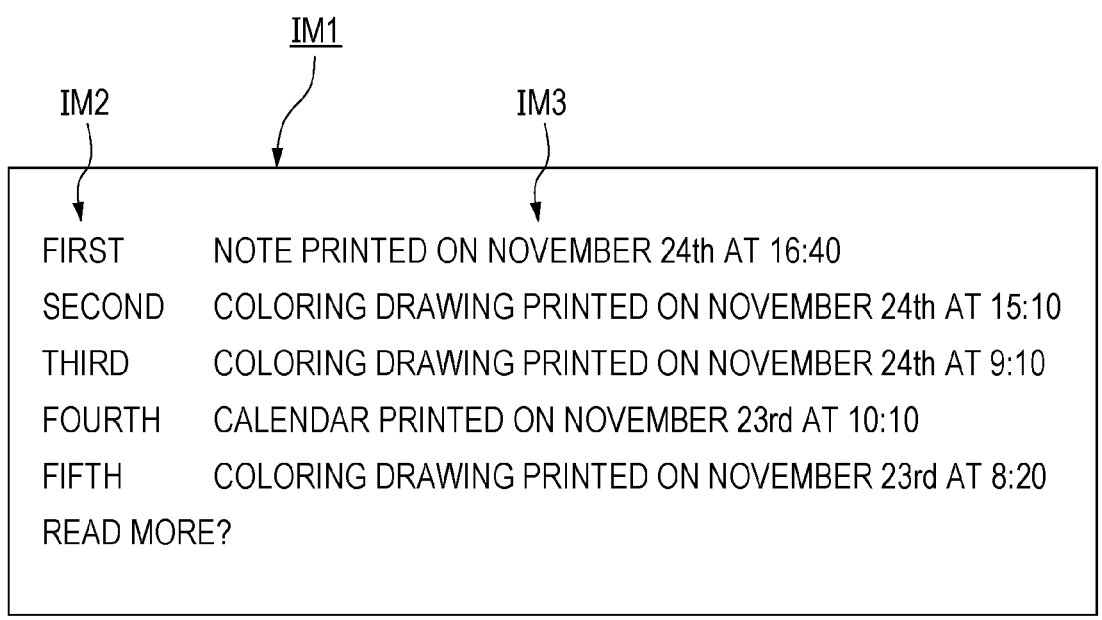
FIG. 11 is a schematic diagram of an example of read information that includes record identification information and individual record information.

FIG. 4 is a schematic block diagram of a configuration example of the printing process table TA2. The printing process table TA2 has information on processes to be performed in response to a plurality of keywords KE0, which can be contained in a voice message together with a request keyword "print" and other similar request keywords. The keywords KE0 in the printing process table TA2 include selection keywords KE1 for use in determining a target record from individual records R0 in the print history 600 and category keywords KE6 for use in determining a category of the target record. The selection keywords KE1 include last print determination keywords KE2, N-times-ago determination keywords KE3, and record-identification-information determination keywords KE5; the last print determination keywords KE2 are used to determine that the record that has been printed last is the target record, the N-times-ago determination keyword KE3 is used to determine that the record that has been printed N times ago (N: integer equal or more than 2) is the target record, and the record-identification-information determination keyword KE5 is used to determine record identification information IM2 contained in read information IM1 as illustrated in FIG. 11. In this case, the keywords KE0 in the printing process table TA2 may include a specific keyword for use in determining a plurality of target records from individual records R0 contained in the print history 600.

In the printing process table TA2 of FIG. 4, the keywords "previously" and "recently" are examples of a last print determination keyword KE2, which is used to reprint the printed content corresponding to the latest one of the individual records R0. The keyword "three times ago" is an example of an N-times-ago determination keyword KE3, which is used to reprint the printed content corresponding to one of the individual records R0 which has been stored N times ago. The keyword "the second" is an example of a record-identification-information determination keyword KE5, which is used to reprint the printed content corresponding to one of the individual records R0 in the read information IM1 which has been read second. The keyword "coloring drawing" is an example of a category keyword KE6, which is used to narrow down a search for individual records R0 contained in the print history 600 to those with a category "coloring drawing".

FIG. 5 is a schematic block diagram of a configuration example of the reading process table TA3. The reading process table TA3 has information on processes to be performed in response to a plurality of keywords KE0, which can be contained in a voice message together with a request keyword "what was printed" and other similar request keywords. The keywords KE0 in the reading process table TA3 include read instruction keywords KE4 and category keywords KE6; the read instruction keywords KE4 are used to instruct the smart speaker 300 to output individual record information IM3 contained in the read information IM1 as illustrated in FIG. 11, and the category keyword KE6 is used to specify the category of the individual record information IM3 to be read.

In the reading process table TA3 of FIG. 5, the keyword "to date" is an example of a read instruction keyword KE4, which is used to instruct the smart speaker 300 to output an M number (M: integer equal to or more than two) of individual records R0 that have been stored recently. The keyword "coloring drawing" is an example of a category keyword KE6, which is used to narrow down individual records R0 to be read which is contained in the print history 600 to those with the category "coloring drawing". The request keywords are not limited to the above examples and may be any other ones. In addition, the voice UI may store process tables related to various request keywords and be able to process voice commands containing such request keywords in accordance with the process table.

Figure 6:
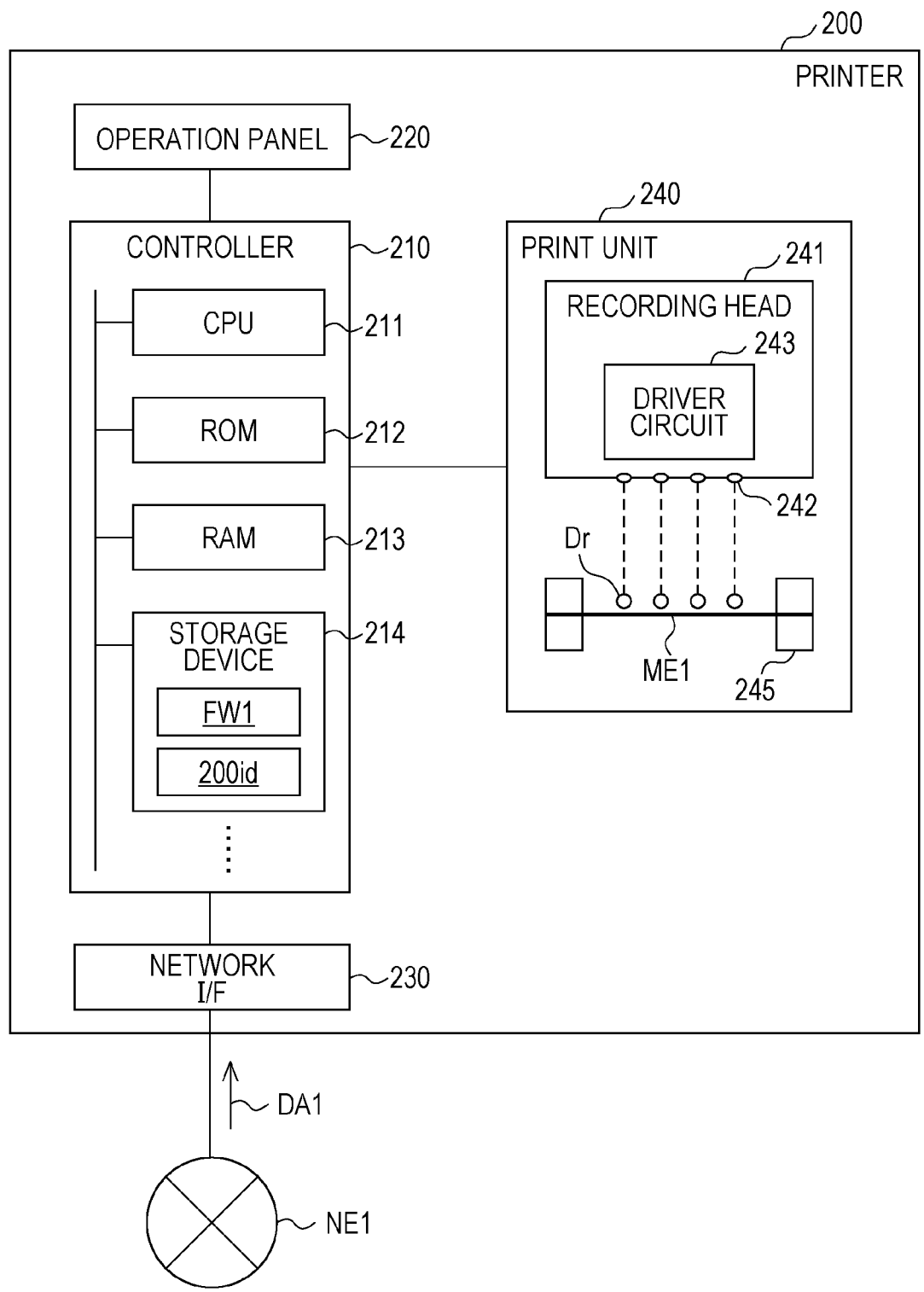
FIG. 6 is a schematic block diagram of a configuration example of the printer.

FIG. 6 is a schematic block diagram of a configuration example of the printer 200. The printer 200 may be a printing apparatus that prints a content in accordance with print data DA1 that has been received over the network NE1. Examples of the printer 200 used for the printing system SY1 include, but is not limited to, ink jet printers, laser printers, and other electrophotographic printers. Obviously, the printer 200 may be a copy machine, a facsimile machine, or a multi-function peripheral having the functions of such machines. In the example of FIG. 6, the printer 200 is implemented by an ink jet printer.

As illustrated in FIG. 6, the printer 200 includes a controller 210, an operation panel 220, a network interface (I/F) 230, and a print unit 240. The controller 210 includes a central processing unit (CPU) 211, read only memory (ROM) 212, random access memory (RAM) 213, and a storage device 214. These components are electrically interconnected so that one of the components can transmit/receive information to or from another. The printer 200 may be a certain type of computer. Stored in the storage device 214 are a firmware FW1 and printer identification information 200*id*, for example; the firmware FW1 is used to cause a computer to function as the printer 200, and the printer identification information 200*id* is used for other apparatuses to identify the printer 200. For example, the printer identification information 200*id* may contain a mail address, an internet protocol (IP) address, and a serial number. For example, the storage device 214 may be a magnetic storage device, such as a hard disk, or a nonvolatile semiconductor memory, such as a flash memory.

For example, the operation panel 220 has a display section and an operation input section through which the user operates the printer 200. For example, the display section may be a liquid crystal panel that displays information regarding a state of the printer 200 and a user's instruction. For example, the operation input section may be a plurality of operation keys including a cursor and a decision key or may be a touch panel to be operated on a display screen. The network I/F 230 is coupled to the network NE1 so that the printer 200 can communicate with any apparatus coupled to the network NE1 in conformity with a predetermined communication protocol.

The print unit 240 includes a recording head 241 and a paper feeder 245; the recording head 241 discharges droplets Dr, such as ink droplets, onto a print substrate ME1, and the paper feeder 245 transports the print substrate ME1. The recording head 241 includes: a plurality of nozzles 242; and a driver circuit 243 that causes the recording head 241 to discharge the droplets Dr through the nozzles 242. For example, the driver circuit 243 may be a circuit that drives a piezoelectric element to apply pressure to liquid inside a pressure chamber communicating with the nozzles 242 or that drives a thermal element to create bubbles by heating the liquid in the pressure chamber. The paper feeder 245 transports the print substrate ME1, and then the recording head 241 discharges the droplet Dr onto the print substrate ME1, thereby forming a print image on the print substrate ME1 in accordance with the print data DA1 received from the information processing apparatus 100. The print substrate ME1 is a material on which a print image is to be created. For example, the print substrate ME1 may be made of a paper, resin, or metal. The shape of the print substrate ME1 may be typically a rectangle or a roll. Alternatively, the shape of the print substrate ME1 may be substantial circle like the shape of an optical disc, a polygon other than a rectangle, or a solid geometry.

Figure 7:
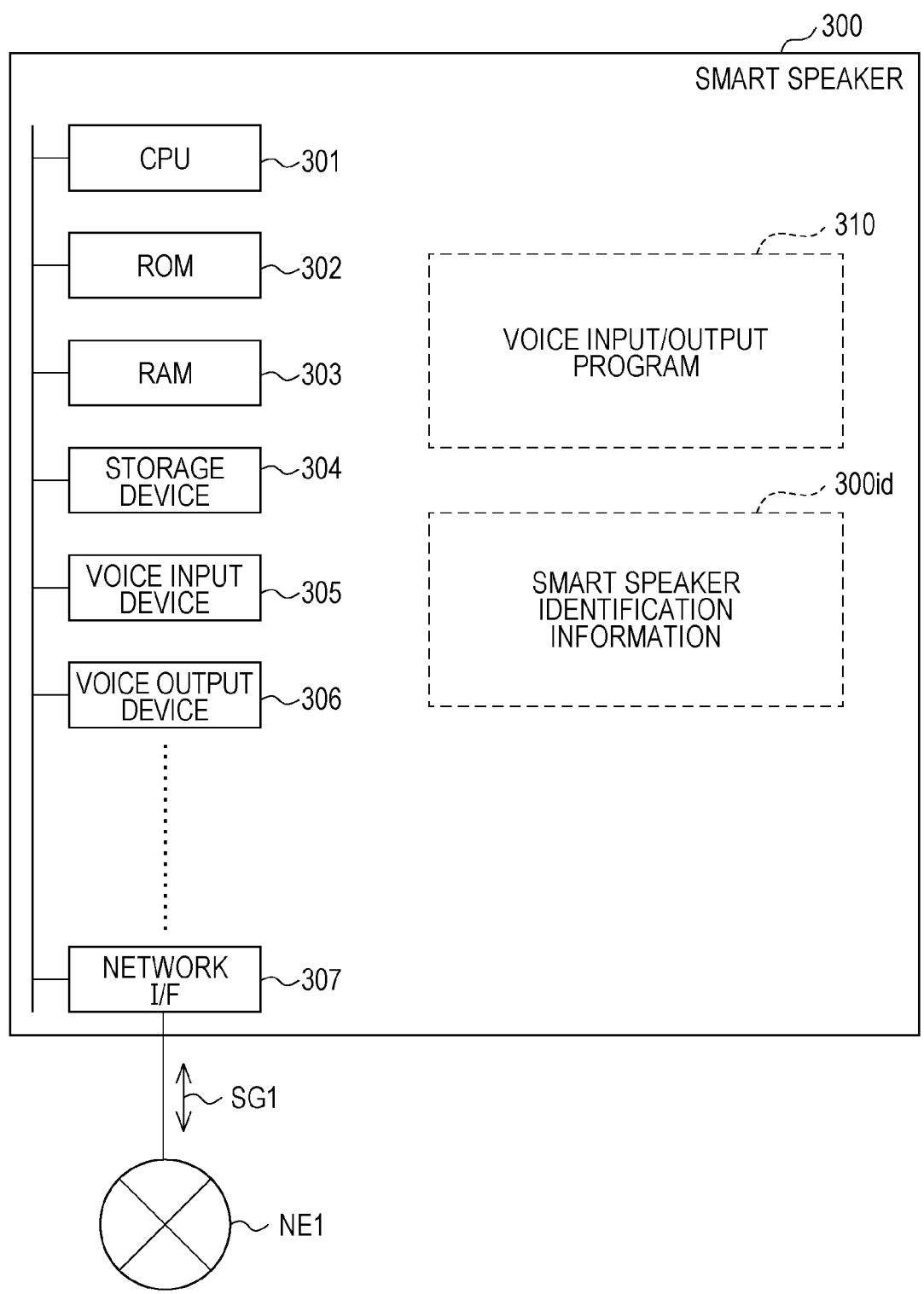
FIG. 7 is a schematic block diagram of a configuration example of the smart speaker.

FIG. 7 is a schematic block diagram of a configuration example of the smart speaker 300 that utilizes the voice recognition service applied by the voice intermediate apparatus 400. The smart speaker 300 includes a central processing unit (CPU) 301, read only memory (ROM) 302, random access memory (RAM) 303, a storage device 304, a voice input device 305, a voice output device 306, and a network interface (I/F) 307. All of these components are electrically interconnected so that one of the components can transmit/receive information to or from another. The smart speaker 300 may be a certain type of computer. Stored in the storage device 304 are a voice input/output program 310 and smart speaker identification information 300*id*. The voice input/output program 310 causes a computer to function as the smart speaker 300. The smart speaker identification information 300*id* is used for other apparatuses to identify the smart speaker 300. For example, the storage device 304 may be a magnetic storage device, such as a hard disk, or a nonvolatile semiconductor memory, such as a flash memory.

The voice input device 305 includes: a microphone that converts an incoming voice into an analog electrical signal; and an analog-digital (AD) converter that converts the analog electrical signal into a digital voice signal SG1. Herein, any number of voice input devices 305 may be provided in the smart speaker 300. The voice output device 306 has a speaker that converts an electric signal into sound. The voice output device 306 converts the digital voice signal SG1 into an analog electric signal and outputs the sound based on the converted analog electric signal via the speaker. Herein, any number of voice output devices 306 may be provided in the smart speaker 300. The network I/F 307 is coupled to the network NE1 so that the smart speaker 300 can communicate with any apparatus coupled to the network NE1 in conformity with a predetermined communication protocol.

The voice intermediate apparatus 400 may be a server computer, which includes a central processing unit (CPU), read only memory (ROM), random access memory (RAM), a storage device, an input device, a display device, and a network interface (I/F), for example.

4. CONCRETE EXAMPLE OF SYSTEM PROCESS

Figure 8:
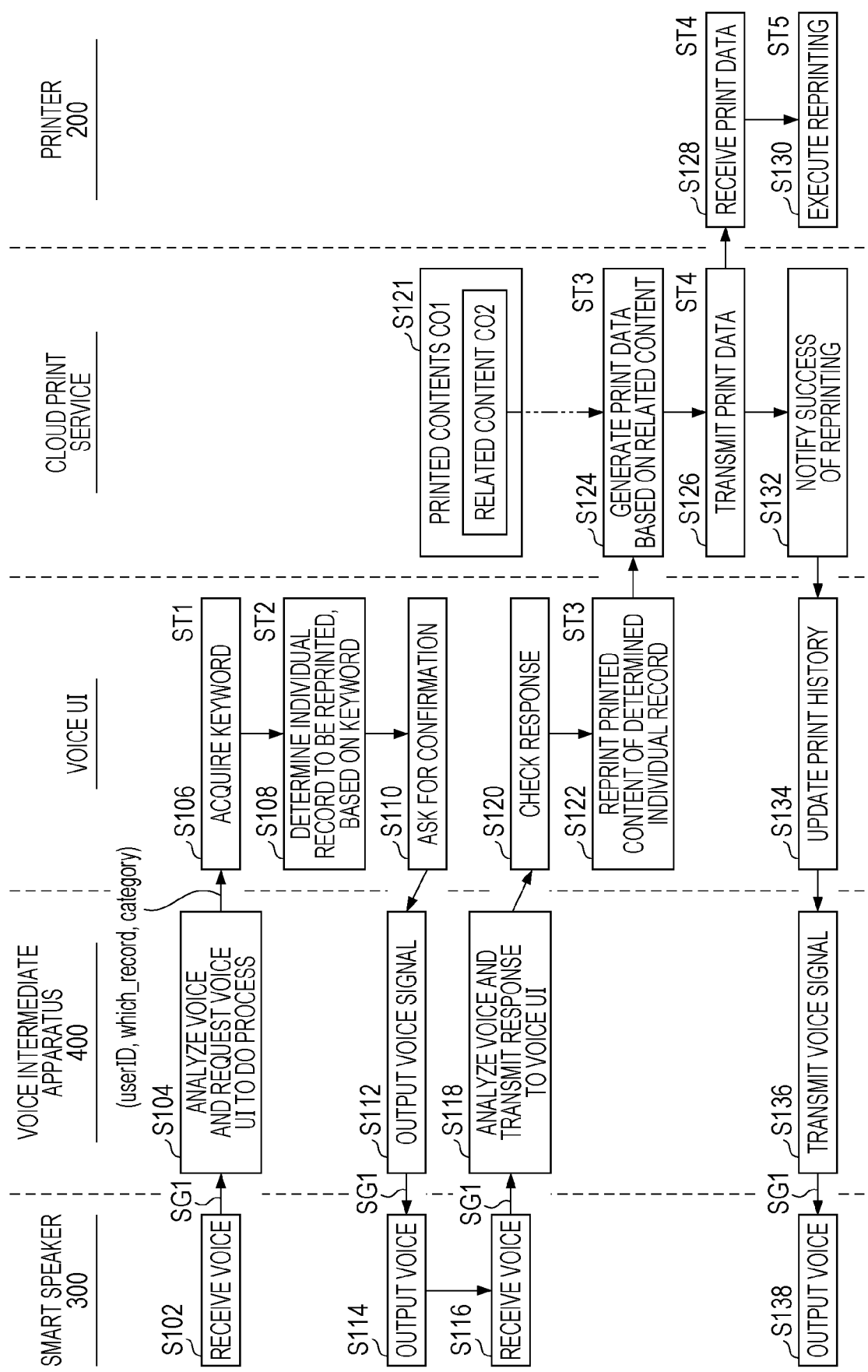
FIG. 8 is a schematic chart of an example of a process of receiving a voice command and printing a content.

FIG. 8 is a schematic chart of an example of a process in which the overall system including the printing system SY1 receives a voice command from the user US1 and prints a content in accordance with the received voice command. As described above, the "voice UI" corresponds to the section of the information processing apparatus 100 which realizes a function called the voice UI, and the "cloud print service" corresponds to the section of the information processing apparatus 100 which realizes a function called the cloud print service. The process that starts with Step S106 is performed in response to the entry of a voice containing a request keyword "print" in the smart speaker 300. The process at Step S106 is related to the acquiring step ST1, the acquisition unit 112, and the acquiring function FU1. The process at Step S108 is related to the target record determining step ST2, the target record determiner 113, and the target record determining function FU2. The process at Steps S122 to S124 is related to the print data generating step ST3. The process at Steps S126 to S128 is related to the print data transmitting step ST4. The process at Steps S124 to S126 is related to the print data transmitter 122 and the print data transmitting function FU3. The process at Step S130 is related to the printing step ST5.

When the user US1 speaks some words related to printing toward the smart speaker 300, at Step S102, the smart speaker 300 receives the user's voice and converts the received voice into a digital voice signal SG1. Then, the smart speaker 300 transmits the converted digital voice signal SG1 to the voice intermediate apparatus 400 over the network NE1. At Step S104, the voice intermediate apparatus 400 receives the digital voice signal SG1 and then analyzes the voice contained in the digital voice signal SG1. After that, the voice intermediate apparatus 400 passes keywords KE0 generated as a result of the analysis to the voice UI and optionally further passes a user identification information user ID, which is used to identify the user US1, to the voice UI. In this way, the voice intermediate apparatus 400 requests the voice UI to perform the process related to the keywords KE0. In this case, the keywords KE0 are contained in the words who the user has spoken in order to instruct printing.

The voice intermediate apparatus 400 has a storage device in which user identification information user IDs and information regarding characteristics of users' voices are stored. Further, the user identification information user IDs are stored in relation to respective users, and the information regarding characteristics of users' voices is stored in relation to the user identification information user IDs. As an example, the characteristic of a user's voice, which is used to distinguish this user from others, may be a frequency spectrum. In this case, the voice intermediate apparatus 400 may determine the frequency spectrum of the user's voice, based on the digital voice signal SG1, then select one of the frequency spectrums of the users which is the most similar to the determined one, and acquire the user identification information user ID related to the selected frequency spectrum from the storage device. After that, the voice intermediate apparatus 400 may pass the acquired user identification information user ID to the voice UI. Alternatively, the smart speaker 300 may ask for a user's name and add the acquired name to the digital voice signal SG1. In this case, the voice intermediate apparatus 400 may extract the name from the digital voice signal SG1 and acquire the identification information user ID related to the name from the storage device. After that, the voice intermediate apparatus 400 may pass the acquired user identification information user ID to the voice UI. Obviously, the user does not have to pass the user identification information user ID if there is no need to distinguish a user.

If the voice further contains a request keyword, the voice intermediate apparatus 400 analyzes the request keyword to generate keyword KE0 and then passes the generated keywords KE0 to the voice UI. In this case, the keywords KE0 may include a selection keyword KE1 as illustrated in FIG. 4, a read instruction keyword KE4 as illustrated in FIG. 5, and a category keyword KE6 as illustrated in FIG. 4 or 5. In FIG. 8, the information "which_record" corresponds to the selection keyword KE1, and the information "category" corresponds to the category keyword KE6.

At Step S106, the voice UI receives the keyword KE0 and the user identification information user ID, if the user identification information user ID is present, from the voice intermediate apparatus 400.

At Step S108, the voice UI determines, based on the received keywords KE0, which of the individual records R0 contained in the print history 600 is a target record, which is an individual record R0 to be reprinted. In this case, as a pre-process for the process at Step S108, the voice UI may refer to the printing history table TA1 as illustrated in FIG. 3 and may determine the target record from the individual records R0 that have been stored within a past predetermined period, such as the past one week. A reason for performing this pre-process is to protect the user's privacy, because the user US1 may forget some contents that have been printed before. FIG. 9 is a schematic diagram of an example of a process of narrowing down a search for individual records R0 contained in the print history 600 to those that have been stored in a past predetermined period. If the present date is set to November 24 and the past predetermined period is set to the past one week, the individual record R17 is excluded from the list of individual records R0 to be searched for, as illustrated in FIG. 9. Alternatively, the voice UI may ask the user US1 whether to designate the period used to search for the individual records R0 via the smart speaker 300 and the voice intermediate apparatus 400. If the user US1 does not designate the period, the voice UI may determine the target record from all the individual records R0 that have been stored within the entire period.

When receiving the user identification information user ID, the voice UI narrows down the search for the individual records R0 contained in the print history 600 to those linked to the user US1 related to the received user identification information user ID. In short, the information processing apparatus 100 determines the target record from the individual records R0 contained in the print history 600 which are linked to the user US1 related to the user identification information user ID. If not receiving the user identification information user ID, the voice UI does not have to narrow down the search for the individual records R0 by using the user identification information user ID.

The voice UI refers to the printing process table TA2 as illustrated in FIG. 4 and performs a process related to the received keywords KE0.

If receiving information "category" that specifies the category, the voice UI refers to the printing process table TA2 and performs a process related to the category keyword KE6 corresponding to the "category". For example, if the information "category" indicates "coloring drawing", the voice UI narrows down the search for individual records R0 contained in the print history 600 to those related to the "coloring drawing". In this way, the information processing apparatus 100 determines the target record from the individual records R0 contained in the print history 600 which are related to the specified category. If not receiving the information "category", the voice UI does not have to narrow down the search for the individual records R0 by using the category.

If receiving information "which_record" that specifies the individual record R0, the voice UI refers to the printing process table TA2 and performs the process related to the selection keyword KE1 corresponding to "which_record". For example, if the information "which_record" indicates "previously" or "recently", the voice UI searches the print history 600 for the latest individual record R0 and determines the found individual record R0 is the target record. However, if not receiving the information "which_record", the voice UI does not have to narrow down the search for the individual records R0 by using the selection keyword KE1.

For example, if the present date is set to November 24 and the past predetermined period is set to the past one week, the voice UI excludes the individual record R17 from the print history 600 as illustrated in FIG. 3 and then searches the print history 600, as illustrated in FIG. 9, for the individual records R11 to R16, R21, R22, R31, and R32. In addition, if the user US1, or the user 1 in this case, speaks "reprint previously printed coloring drawing", the voice UI searches the print history 600 for the individual records R12, R13, R15, and R16 with the user "user 1" and the category "coloring drawing". Further, since the keyword "previously" corresponds to the last print determination keyword KE2 for use in determining the latest individual record, the voice UI determines that the individual record R12 is the target record. If the user 1 speaks "reprint the coloring drawing printed three times ago", the voice UI determines that the individual record R15 is the target record, because the keyword "three times ago" corresponds to the N-times-ago determination keyword KE3 for use in determining the individual record that has been stored in the print history 600 three times ago. Optionally, individual records R0 may be managed while being linked to the IDs of a plurality of smart speakers stored, for example, in the smart speaker identification information 300id as illustrated in FIG. 7, and print histories may be generated for the respective smart speakers. In this case, when an unauthorized user speaks toward the smart speaker 300, the voice UI may refer to the print histories and determine, based on the selection keyword KE1, which of the individual records is the target record.

At Steps S110 to S120, the voice UI asks the user US1 whether to reprint the determined target record via the smart speaker 300 and the voice intermediate apparatus 400. Optionally, the voice UI may further ask the user US1 whether to skip the confirmation process at S110 to S120 via the smart speaker 300 and the voice intermediate apparatus 400. If the user US1 wishes to skip this confirmation process, the voice UI may perform the process at Step S122 immediately after the process at Step S108.

At Step S110, the voice UI requests the voice intermediate apparatus 400 to ask the user US1 whether to reprint the determined target record. In this case, the voice UI may request the voice intermediate apparatus 400 to cause the smart speaker 300 to output the print date and time and category of the target record and a message that the target record will be reprinted. For example, if the individual record R12 is the target record, the voice UI may request the voice intermediate apparatus 400 to cause the smart speaker 300 to output a voice message "do you want to reprint the coloring drawing printed on November 24th at 15:10. When receiving the request, at Step S112, the voice intermediate apparatus 400 generates a digital voice signal SG1 based on the received request and transmits the generated digital voice signal SG1 to the smart speaker 300. When receiving the digital voice signal SG1, at Step S114, the smart speaker 300 converts the received digital voice signal SG1 into a voice signal and then outputs the converted voice signal. The user US1 thereby can listen to the message that the target record with a certain print date and time and a certain category will be reprinted. If the user accepts the reprinting of the individual record R0, for example, by responding to the voice message with a voice "Yes", the printer 200 reprints the printed content corresponding to the target record via the cloud print service.

When receiving the voice message of the acceptance of the reprinting from the user US1, at Step S116, the smart speaker 300 converts the user's voice into a digital voice signal SG1 and then transmits the converted digital voice signal SG1 to the voice intermediate apparatus 400 over the network NE1. When receiving the digital voice signal SG1, at Step S118, the voice intermediate apparatus 400 analyzes the voice contained in the digital voice signal SG1. If the analyzed voice contains the acceptance of the reprinting, the voice intermediate apparatus 400 passes this user's response to the voice UI. When receiving the user's response, at Step S120, the voice UI checks the response and then proceeds to the process at Step S122.

At Step S122, the voice UI requests the cloud print service to reprint the printed content corresponding to the determined target record. At Step S124, the cloud print service generates print data DA1 based on the related content CO2, which is one of the printed contents CO1 stored in the content storage unit 121 and is related to the target record. As an example, if the individual record R12 in the printing history table TA1 as illustrated in FIG. 9 corresponds to the target record, the cloud print service generates print data DA1 for use in reprinting the coloring drawing with the print content ID "005" stored in the content storage unit 121 as illustrated in FIG. 2. As another example, if the individual record R15 in the printing history table TA1 as illustrated in FIG. 9 corresponds to the target record, the cloud print service generates print data DA1 for use in reprinting the coloring drawing with the print content ID "003" stored in the content storage unit 121 as illustrated in FIG. 2.

At Step S126, the cloud print service transmits the print data DA1 to the printer 200 over the network NE1. At Step S128, the printer 200 receives the print data DA1 over the network NE1. At Step S130, the printer 200 reprints the related content CO2 in accordance with the print data DA1. In this way, the printing system SY1 reprints the related content CO2 in response to the voice of the user US1. As an example, if the user US1, or the user 1, speaks "reprint the previous printed coloring drawing" toward the smart speaker 300, as described above, the cloud print service sets the related content CO2 to the printed content with the print content ID "005" corresponding to the individual record R12 and then causes the printer 200 to reprint the related content CO2. As another example, if the user US1 speaks "reprint the coloring drawing printed three times ago" toward the smart speaker 300, as described above, the cloud print service sets the related content CO2 to the printed content with the print content ID "003" corresponding to the individual record R15 and then causes the printer 200 to reprint the related content CO2.

After having transmitted the print data DA1, at Step S132, the cloud print service notifies the voice UI that the related content CO2 has been successfully reprinted. When receiving the notification, at Step S134, the voice UI updates the print history 600 by linking the information on the user, the category, and the print content ID to the print date and time of the related content CO2. Then, the voice UI stores the updated print history 600 in the printing history table TA1. In this case, the voice UI may delete, from the print history 600, individual records R0 that have been stored in the printing history table TA1 for a more than predetermined period, such as one week. Furthermore, the voice UI notifies the voice intermediate apparatus 400 that the related content CO2 has been successfully reprinted. In this case, the voice UI may cause the smart speaker 300 to output a message that the related content CO2 determined with the keyword KE0 extracted from the voice of the user US1 has been successfully reprinted. For example, if the user US1 speaks "reprint the previously printed coloring drawing", the voice UI may cause the smart speaker 300 to output the message "the previously printed coloring drawing has been successfully reprinted". Then, when receiving the notification from the voice UI, at Step S136, the voice intermediate apparatus 400 generates a digital voice signal SG1 based on the received notification and then transmits the generated digital voice signal SG1 to the smart speaker 300. When receiving the digital voice signal SG1, at Step S138, the smart speaker 300 converts the digital voice signal SG1 into a voice signal and then outputs the voice signal toward the user US1. The user US1 thereby can listen to the voice message that the related content CO2 has been successfully reprinted.

There are cases where the user US1 forgets some contents that have been printed before. Therefore, the overall system including the printing system SY1 may read individual record information on the individual records R0 in the print history 600 in response to a request from the user US1.

Figure 10:
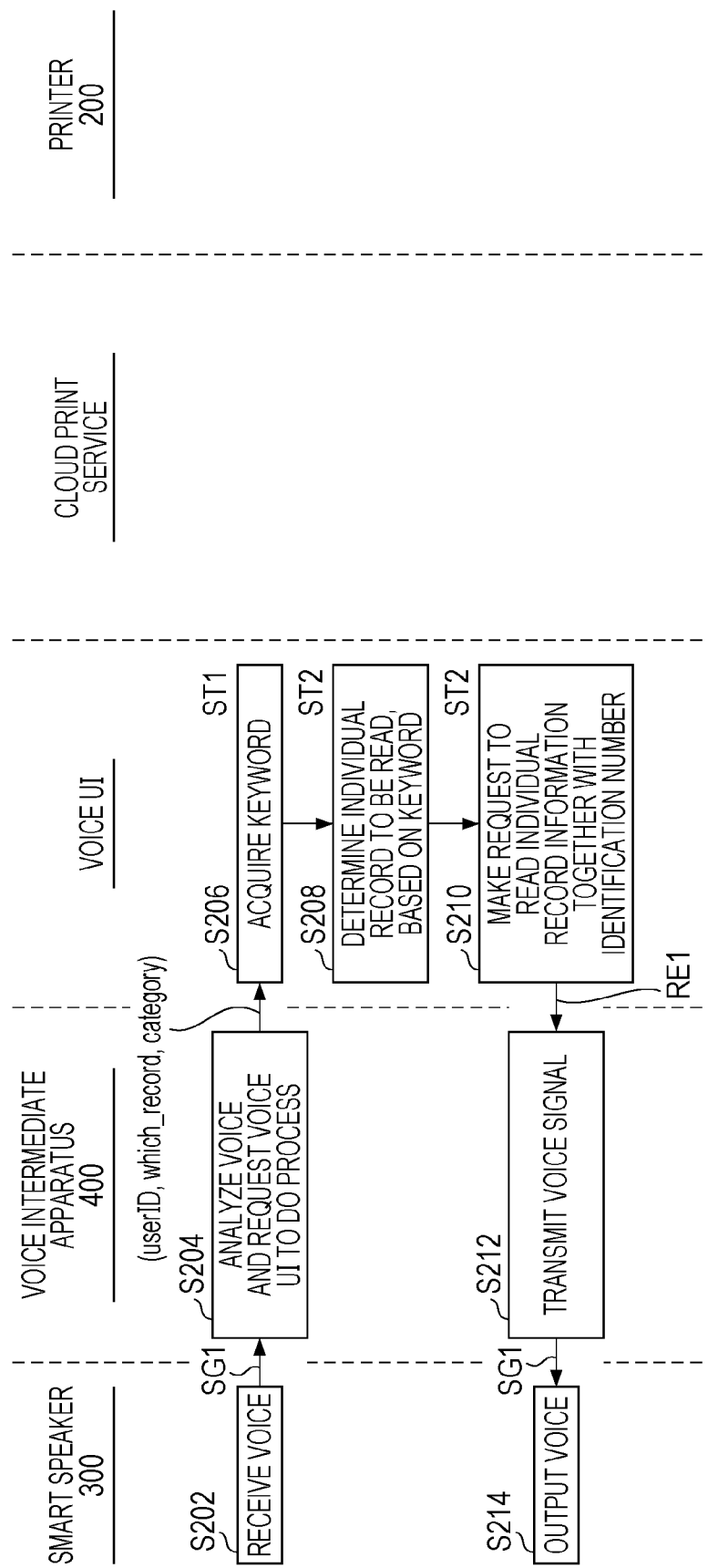
FIG. 10 is a schematic chart of an example of a process of reading individual record information in response to a voice command.

FIG. 10 is a schematic chart of an example of a process in which the overall system including the printing system SY1 reads individual record information IM3 in response to a voice command. The process at Steps S206 to S214 is performed in response to the entry of a voice message containing a request keyword "what contents were printed?", for example, in the smart speaker 300. The process at Step S206 is related to the acquiring step ST1, the acquisition unit 112, and the acquiring function FU1. The process at Steps S208 to S210 is related to the target record determining step ST2, the target record determiner 113, and the target record determining function FU2.

When the user US1 requests the smart speaker 300 to read the print history 600, at Step S202, the smart speaker 300 converts the user's voice into a digital voice signal SG1 and then transmits the converted digital voice signal SG1 to the voice intermediate apparatus 400 over the network NE1. When receiving the digital voice signal SG1, at Step S204, the voice intermediate apparatus 400 analyzes the voice contained in the digital voice signal SG1 and generates keywords KE0 based on the analysis. Then, the voice intermediate apparatus 400 passes the generated keywords KE0 to the voice UI and optionally further passes a user identification information user ID, which is used to identify the user US1, to the voice UI. In this way, the voice intermediate apparatus 400 requests the voice UI to perform the process related to the keywords KE0. In this case, the keywords KE0 generated based on the request keyword "what contents were printed?" contained in the user's voice may include a read instruction keyword KE4 and a category keyword KE6, for example, as illustrated in FIG. 5.

At S206, the voice UI acquires the keywords KE0 from the voice intermediate apparatus 400 and, if the user identification information user ID is present, acquires the user identification information user ID.

At Step S208, the voice UI determines, based on the acquired keywords KE0, which of the individual records R0 contained in the print history 600 are target records to be read. If receiving the user identification information user ID, the voice UI narrows down a search for individual records R0 to be read which is contained in the print history 600 to those that are linked to the user US1 related to the user identification information user ID. If not receiving the user identification information user ID, the voice UI does not have to narrow down the search for the individual records R0 to be read by using the user identification information user ID.

The voice UI refers to the reading process table TA3 as illustrated in FIG. 5 and then performs the process related to the keywords KE0. Further, when receiving information "category" that specifies a category, the voice UI refers to the reading process table TA3 and then performs the process related to the category keyword KE6 specified by the information "category". For example, if the information "category" indicates a coloring drawing, the voice UI narrows down the search for the individual records R0 to be read which are contained in the print history 600 to those with the category "coloring drawing". If not receiving the information "category", the voice UI does not have to narrow down the search for the individual records R0 by using the category.

When receiving information "which_record" that specifies an individual record R0, the voice UI refers to the reading process table TA3 and then performs the process related to the read instruction keyword KE4 specified by the information "which_record". For example, if the information "which_record" indicates "to data", the voice UI determines that an M number (M: an integer equal to or more than 2; M=5 in this case) of recent individual records R0 contained in the print history 600 are the target records to be read.

For example, if the user US1, or the user 1, asks "what contents were printed to date?" to the smart speaker 300, the voice UI refers to the print history 600 as illustrated in FIG. 9 and determines that the individual records R11 to R15 with the user "user 1" are the target records R0 to be read, because the keyword "to date" corresponds to read instruction keywords KE4 for use in reading five recent individual records.

At Step S210, the voice UI transmits a read request RE1 to the voice intermediate apparatus 400 which instructs the smart speaker 300 to output the read information IM1 as illustrated in FIG. 11. Herein, the read information IM1 is used for the smart speaker 300 to output the individual record information IM3 that indicates the individual records R0 together with the record identification information IM2 added to the individual records R0. The record identification information IM2 may be sequential numbers, such as "first", "second", and "third". The individual record information IM3 may contain print dates and times or the combination of print dates and times and categories, for example, which are part of the information contained in the printing history table TA1 as illustrated in FIG. 9. In the example of FIG. 11, the individual record information IM3 contains the combination of print dates and times and categories. In this case, the voice UI may further request the voice intermediate apparatus 400 to cause the smart speaker 300 to output a question of whether to read other individual records R0, such a voice message "read more?". When the user US1 speaks the answer "Yes" toward the smart speaker 300, the voice UI may transmit a read request RE1 to the voice intermediate apparatus 400 which instructs the smart speaker 300 to read other five individual records R0.

When receiving the read request RE1, at Step S212, the voice intermediate apparatus 400 generates a digital voice signal SG1 based on the read information IM1 and then transmits the generated digital voice signal SG1 to the smart speaker 300. When receiving the digital voice signal SG1, at Step S214, the smart speaker 300 converts the digital voice signal SG1 into a voice signal and then outputs the voice signal. The user US1 thereby can listen to the read information IM1 containing the record identification information IM2 and the individual record information IM3.

When listening to the read information IM1, the user US1 speaks an instruction to reprint a record-identification-information determination keyword KE5, which is used to determine the record identification information IM2, toward the smart speaker 300. In response to this instruction, the overall system including the printing system SY1 performs the process as illustrated in FIG. 8. At Step S108, the voice UI refers to the printing process table TA2 as illustrated in FIG. 4 and then performs the process related to the acquired keywords KE0. For example, if the user US1, or the user 1, speaks "reprint the second printed content", the voice UI refers to the print history 600 as illustrated in FIG. 9. Then, the voice UI determines the individual record R12, which has been read second among the individual records R11 to R15, is the target record. This is because the keyword KE0 "the second" corresponds to a record-identification-information determination keyword KE5 for use in reprinting the printed content related to the individual record R0 in the read information IM1 which has been read second. At Step S122, the voice UI requests the cloud print service to reprint the related content CO2 of the determined target record. At Step S124, the cloud print service generates a print data DA1 based on the related content CO2 and then, at Step S126, transmits the generated print data DA1 to the printer 200. At Step S128, the printer 200 receives the print data DA1 and then, at Step S130, reprints the related content CO2 in accordance with the print data DA1. In this way, the overall system including the printing system SY1 reprints the related content CO2 in response to the voice of the user US1.

As described above, an information processing apparatus 100 searches a print history 600 for a printed content CO1 corresponding to a target record, which is an individual record R0 to be reprinted, based on keywords KE0 contained in a voice reprint instruction from a user US1 and then generates print data DA1 based on the printed content CO1. After that, the information processing apparatus 100 transmits the generated print data DA1 to a printer 200. When receiving the print data DA1, the printer 200 reprints the printed content CO1 in accordance with the print data DA1, thereby providing a printed content designated by a voice command of the user US1. Consequently, an overall system including a printing system SY1 enables a user to cause a printer to reprint a desired printed content with a voice command even if the voice command fails to directly designate this content.

5. MODIFICATION

The foregoing embodiment of the present disclosure may be modified in various ways. Instead of a smart speaker 300 that functions as a voice input/output apparatus, for example, a terminal, such as a smartphone or a tablet, or a personal computer may be used.

A voice UI in an information processing apparatus 100 may regularly, such as daily, delete individual records R0 that have been stored in a print history 600 for more than a predetermined period, thereby providing highly secure privacy protection.

6. CONCLUSION

Some aspects of the present disclosure provide techniques that enable a user to cause a printer to reprint a desired printed content with a voice command even if the voice command fails to directly designate this content. Obviously, techniques including the components in each individual independent claim can produce the above primary effects. Moreover, configurations formed by exchanging, combining, or modifying some components disclosed in the above examples or by exchanging or combining some components disclosed in the above examples and in related art are conceivable. It should be noted that such configurations fall within the scope of the present disclosure.

What is claimed is:

1. A printing system comprising:
a printing apparatus; and
an information processing apparatus coupled to the printing apparatus over a network, the information processing apparatus including:
  a history storage unit that stores a print history that indicates a history of a printing operation performed by the printing apparatus;
  an acquisition unit that acquires a keyword contained in a voice print command from a voice intermediate apparatus;
  a target record determiner that determines, based on the acquired keyword, a target record from a plurality of individual records contained in the print history, the target record being an individual record to be reprinted; and
  a print data transmitter that generates print data, based on a related content and transmits the generated print data to the printing apparatus, the related content being one of a plurality of printed contents which corresponds to the determined target record, the printing apparatus being configured to receive the print data and to perform the printing operation in accordance with the print data, wherein:
the keyword comprises a read instruction keyword and a record-identification-information determination keyword, the read instruction keyword being used to read individual record information that indicates the individual records together with record identification information added to the individual records contained in the print history, the record-identification-information determination keyword being used to determine the record identification information, and when the acquisition unit acquires the read instruction keyword, the target record determiner outputs a read request to the voice intermediate apparatus to output a voice signal containing the record identification information and the individual record information to a voice input/output apparatus, and when the acquisition unit acquires the record-identification-information determination keyword, the target record determiner determines that one of read targets of the individual records contained in the print history is the target record, the one of the read targets being related to the record-identification-information determination keyword.

2. The printing system according to claim 1, wherein
the keyword comprises a selection keyword for use in determining the target record from the individual records contained in the print history, and
when the acquisition unit acquires the selection keyword, the target record determiner determines that one of the individual records which is related to the selection keyword is the target record.

3. The printing system according to claim 2, wherein
the selection keyword comprises a last print determination keyword for use in determining that a record that has been printed last is the target record, and
when the acquisition unit acquires the last print determination keyword, the target record determiner determines that one of the individual records contained in the print history which has been printed last is the target record.

4. The printing system according to claim 1, wherein
the target record determiner determines one of the individual records contained in the print history which has been printed within a past predetermined period is the target record.

5. The printing system according to claim 1, wherein
the history storage unit stores the print history in which the individual records are related to a plurality of categories, and
the keyword comprises a category keyword for use in determining a category, and
when the acquisition unit acquires the category keyword, the target record determiner determines that one of the individual records contained in the print history which has been related to the category is the target record.

6. The printing system according to claim 1, wherein
the history storage unit stores the print history in which the individual records are linked to a plurality of users,
the acquisition unit acquires a user identification information from the voice intermediate apparatus, the user identification information being used to identify the users, and
the target record determiner determines that one of the individual records contained in the print history which is linked to a user who is related to the user identification information is the target record.

7. A printing system comprising:
a printing apparatus; and
an information processing apparatus coupled to the printing apparatus over a network, the information processing apparatus including:
  a history storage unit that stores a print history that indicates a history of a printing operation performed by the printing apparatus;
  an acquisition unit that acquires a keyword contained in a voice print command from a voice intermediate apparatus;
  a target record determiner that determines, based on the acquired keyword, a target record from a plurality of individual records contained in the print history, the target record being an individual record to be reprinted; and
  a print data transmitter that generates print data, based on a related content and transmits the generated print data to the printing apparatus, the related content being one of a plurality of printed contents which corresponds to the determined target record, the printing apparatus being configured to receive the print data and to perform the printing operation in accordance with the print data,
wherein
  the keyword comprises a selection keyword for use in determining the target record from the individual records contained in the print history, and
  when the acquisition unit acquires the selection keyword, the target record determiner determines that one of the individual records which is related to the selection keyword is the target record,
  the selection keyword comprises an N-times-ago determination keyword for use in determining a record that has been printed N times ago is the target record, N being an integer equal to or more than two, and
  when the acquisition unit acquires the N-times-ago determination keyword, the target record determiner determines that one of the individual records contained in the print history which has been printed N times ago is the target record.

8. A printing method using a printing apparatus and an information processing apparatus, the printing apparatus being coupled to the information processing apparatus over a network, the printing method comprising:
  an acquiring step of acquiring, by using the information processing apparatus, a keyword contained in a voice print command from a voice intermediate apparatus;
  a target record determining step of determining, based on the acquired keyword, a target record from a plurality of individual records contained in a print history, the target record being an individual record to be reprinted, the print history indicating a history of a printing operation performed by the printing apparatus;
  a print data generating step of generating print data, based on a related content, the related content being one of a plurality of printed contents which corresponds to the determined target record;
  a print data transmitting step of transmitting the generated print data from the information processing apparatus to the printing apparatus; and
  a printing step of performing, by using the printing apparatus, the printing operation in accordance with the transmitted print data,
wherein:
  the keyword comprises a read instruction keyword and a record-identification-information determination keyword, the read instruction keyword being used to read individual record information that indicates the individual records together with record identification information added to the individual records contained in the print history, the record-identification-information determination keyword being used to determine the record identification information, and
  when the acquiring step is performed, the target record determining step outputs a read request to the voice intermediate apparatus to output a voice signal containing the record identification information and the individual record information to a voice input/output apparatus, and
  when the acquiring step is performed, the target record determining step determines that one of read targets of the individual records contained in the print history is the target record, the one of the read targets being related to the record-identification-information determination keyword.

* * * * *